J. T. HARNETT.
ANTIFREEZING FAUCET OR STREET WASHER.
APPLICATION FILED JULY 18, 1907.
928,047.
Patented July 13, 1909.
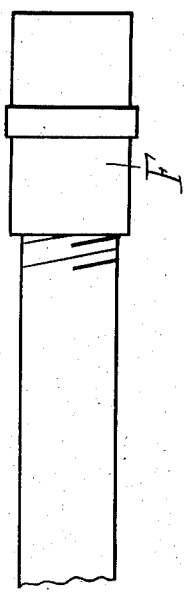
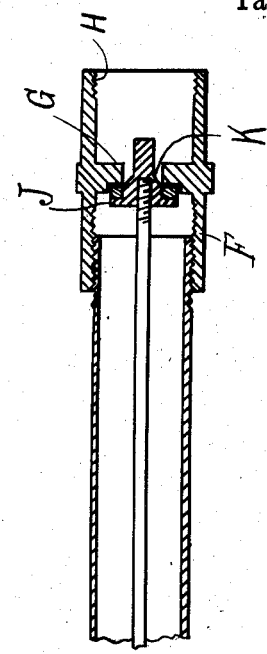
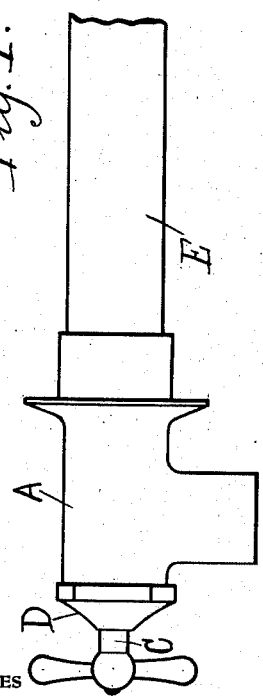
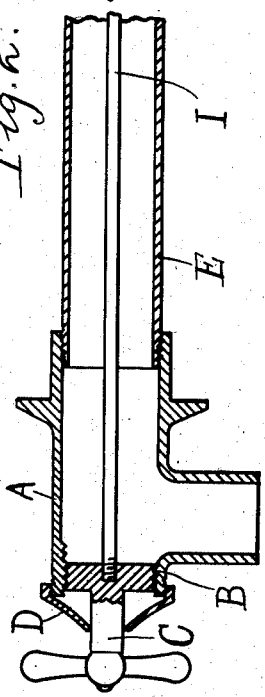
WITNESSES
INVENTOR
John T. Harnett
BY
ATTORNEY

UNITED STATES PATENT OFFICE.

JOHN T. HARNETT, OF PHILADELPHIA, PENNSYLVANIA.

ANTIFREEZING FAUCET OR STREET-WASHER.

No. 928,047.      Specification of Letters Patent.      Patented July 13, 1909.

Application filed July 18, 1907. Serial No. 384,348.

*To all whom it may concern:*

Be it known that I, JOHN T. HARNETT, a citizen of the United States, residing at Philadelphia, county of Philadelphia, and State of Pennsylvania, have invented a certain new and useful Improvement in Antifreezing Faucets or Street-Washers, of which the following is a specification.

My invention relates to a new and useful improvement in antifreezing faucets or street washers, and has for its object to provide an exceedingly simple and effective construction by which the water is cut off from the faucet at a considerable distance therefrom or inside of the building thus preventing the freezing of water in the faucet or adjacent thereto.

A further object of my invention is to so construct a valve that it will be readily guided into place from the opposite end of the extension pipe, and a still further object of my invention is to so construct the faucet that it will have a free passage for the water and at the same time permit the withdrawal of the valve and valve stem through the faucet.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1 is a side view of a faucet made in accordance with my improvement showing the extension pipe and connection for the service pipe, and Fig. 2, a central longitudinal section thereof.

In carrying out my invention as here embodied A represents the faucet having a straightway opening therethrough the outer portion of said opening being threaded as indicated at B for the reception of the threaded portion of the operating handle C, and D represents the threaded cap secured upon the outside of the outer end of the faucet which may be packed in the usual manner to prevent leakage. The inner end of the faucet is internally threaded to receive the extension pipe E, the opposite end of which pipe is also threaded to receive the valve casing F, and this valve casing has formed therein the valve seat G and also is threaded as indicated at H for coupling to the service pipe.

I represents the valve stem which consists of a rod of suitable length which is attached to the operating handle C while the opposite end thereof has secured thereon the valve J, the latter having a washer and a tapered shank K adapted to pass through the hole in the valve seat so as to guide the latter into place.

In practice the extension pipe E is passed through the wall of the building and the valve casing is threaded thereon while the service pipe is coupled to the opposite end of the valve casing after which the faucet is threaded upon the outer end of the extension pipe. When this has been accomplished the valve and valve rod are passed through the faucet until the tapered shank passes into the hole in the valve seat when the threaded portion of the operating handle is screwed into the end of the faucet and the cap D screwed upon the outside thereof. When the valve is closed by turning the operating handle in the proper direction the water will be cut off back of the valve casing and what remains in the extension pipe and faucet will drain therefrom and as the valve casing is inside of the building the water will not freeze, yet when the valve is open by the proper manipulation of the operating handle the water will freely flow through the extension pipe and from the faucet.

One of the advantages of my improvement is that when it is desired to remove the valve for repair or other purposes this may be accomplished by simply threading off the cap D and backing off the operating handle and the valve and valve stem may be withdrawn.

Having thus fully described my invention, what I claim as new and useful, is—

In an anti-freezing faucet, a pipe having a threaded end, a valve casing composed of an annular body having its opposite ends interiorly threaded and having one of said ends threaded onto said threaded end of said pipe, a central partition in said body having a central aperture, and a countersunk part which forms a valve seat, a valve having a body and a shank, a washer received over said shank at the base thereof and being adapted to be received in said countersunk part which forms the valve seat, said shank beyond said washer being tapered and terminating in an extension of approximately uniform diameter which is disposed in said partition opening and which normally extends on the outer side of the partition, said valve body being formed with a threaded opening which extends into its shank, a valve rod threaded into said last named opening, and a faucet, having means connected to said valve rod whereby the same may be operated, carried by the opposite end of the pipe.

In testimony whereof, I have hereunto affixed my signature in the presence of two subscribing witnesses.

JOHN T. HARNETT.

Witnesses:
WM. Q. HARNETT,
J. FRANKLIN MOSS.